United States Patent
Lee et al.

(10) Patent No.: US 6,915,655 B2
(45) Date of Patent: *Jul. 12, 2005

(54) AIR CONDITIONING SYSTEM

(75) Inventors: Won Hee Lee, Seoul (KR); Yoon Jei Hwang, Seoul (KR); Chan Ho Song, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/668,162

(22) Filed: Sep. 24, 2003

(65) Prior Publication Data

US 2004/0134211 A1 Jul. 15, 2004

(30) Foreign Application Priority Data

Jan. 14, 2003 (KR) .............................. P10-2003-0002452

(51) Int. Cl.$^7$ .......................... F25D 17/06; F25D 23/00
(52) U.S. Cl. ............................................. 62/271; 62/94
(58) Field of Search .......................... 62/406, 412, 271, 62/275, 94, 171, 238.3, 238.6, 229, 228, 158, 160

(56) References Cited

U.S. PATENT DOCUMENTS

| | | | | |
|---|---|---|---|---|
| 3,619,987 A | * | 11/1971 | Colvin et al. ................. | 96/111 |
| 4,377,400 A | * | 3/1983 | Okamoto et al. .............. | 96/13 |
| 5,353,606 A | * | 10/1994 | Yoho et al. .................... | 62/271 |
| 5,579,647 A | * | 12/1996 | Calton et al. .................. | 62/94 |
| 5,816,065 A | * | 10/1998 | Maeda ........................ | 62/271 |
| 6,199,394 B1 | * | 3/2001 | Maeda ........................ | 62/271 |
| 6,557,365 B2 | * | 5/2003 | Dinnage et al. .............. | 62/271 |
| 6,575,228 B1 | * | 6/2003 | Ragland et al. ............... | 165/54 |

FOREIGN PATENT DOCUMENTS

KR           0057265          7/2004

OTHER PUBLICATIONS

English language Abstract of Korea 10–2004–0057265.

* cited by examiner

Primary Examiner—Chen Wen Jiang
(74) Attorney, Agent, or Firm—Greenblum & Bernstein, P.L.C.

(57) ABSTRACT

Air conditioning system including a duct having a suction passage for drawing external air and a discharge passage for discharging room air, the suction passage and the discharge passage being split with a split plate, a suction fan and a discharge fan in the suction passage and the discharge passage, respectively, a dehumidifier having a desiccant wheel rotatably mounted in an opening in a split plate of the duct to cross, and exposed to the suction passage and the discharge passage, a regenerative heater in the discharge passage of the duct adjacent to air inlet of the dehumidifier for heating the air introduced into the dehumidifier, a regenerative heat exchanger mounted both in the suction passage and the discharge passage on a room side with reference to the dehumidifier for making heat exchange of the air flowing in the suction passage and the air flowing in the discharge passage, and a heat pump having a first heat exchanger in the discharge passage between the dehumidifier and the regenerative heat exchanger, and a second heat exchanger in the suction passage on the air outlet of the regenerative heat exchanger.

32 Claims, 5 Drawing Sheets

AIR CONDITIONING SYSTEM

This application claims the benefit of the Korean Application No. P2003-0002452 filed on Jan. 14, 2003, which is hereby incorporated by reference.

BACKGROUND OF THE INVENTION

1. Field of the Invention

The present invention relates to air conditioning systems, and more particularly, to an air conditioning system having functions of cooling/heating, ventilation, and dehumidification.

2. Background of the Related Art

In general, the air conditioner cools or heats a room, such as a residential space, and office, to provide a comfortable environment. FIG. 1 illustrates a diagram a cooling/heating system of a related art air conditioner.

Referring to FIG. 1, the cooling/heating system of a related art air conditioner is provided with a compressor 1, a four way valve 2, an outdoor heat exchanger 3, an indoor heat exchanger 4, and an expansion device 5. There are an outdoor fan 3a adjacent to the outdoor heat exchanger 3, and an indoor fan 4a adjacent to the indoor heat exchanger 4. The cooling/heating system changes a flow direction of refrigerant flowing through the indoor and outdoor heat exchangers by switching the four way valve 2 under the control of a controlling part, for carrying out cooling or heating selectively.

A case when the cooling/heating system cools a room will be described. High temperature and high pressure refrigerant flows from the compressor 1 to the outdoor heat exchanger 3 as the four way valve is switched thereto, heat exchanges with external air, is condensed at the outdoor heat exchanger 3, and flows to the expansion device 5. Low temperature and low pressure refrigerant from the expansion device is introduced into, heat exchanges with room air, to absorb latent heat and vaporize, at the indoor heat exchanger 4, and flows to the compressor 1 again. In this instance, as the indoor fan 4a is rotated, the room air passes through, and cooled down at the indoor heat exchanger 4, and discharged to the room again, to cool the room to a constant temperature.

Next, case when the cooling/heating system heats a room will be described. The high temperature and high pressure refrigerant flows from the compressor 1 to, discharges latent heat, and is condensed at, the indoor heat exchanger 4. As the indoor fan 4a rotates, the room air passes through, and is heated at the indoor heat exchanger 4, and is discharged to the room again, to heat the room to a constant temperature. Thereafter, the refrigerant condensed at the indoor heat exchanger 4 passes through, expands at the expansion device 5, vaporizes to heat exchange with the external air at the outdoor heat exchanger 3, and introduced into the compressor 1 again.

The cooling/heating system cools or heats the room at a constant temperature as the foregoing process progresses repeatedly as cycles.

However, the cooling/heating system, cooling or heating the room air and circulating through the room repeatedly, contaminates room air and can not control humidity. When the room air is contaminated, and the humidity is not controlled, users feel unpleasant, and open a window for ventilation. Moreover, the discharge of room air to an exterior in the ventilation causes a large amount of energy loss, to require a large power consumption for cooling or heating required for brining the room temperature to a preset room temperature.

SUMMARY OF THE INVENTION

Accordingly, the present invention is directed to an air conditioning system that substantially obviates one or more of the problems due to limitations and disadvantages of the related art.

An object of the present invention is to provide an air conditioning system having functions of cooling/heating, ventilation, and dehumidification.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the air conditioning system includes a duct having a suction passage for drawing external air and a discharge passage for discharging room air, the suction passage and the discharge passage being split with a split plate, a suction fan and a discharge fan in the suction passage and the discharge passage respectively, a dehumidifier having a desiccant wheel rotatably mounted in an opening in a split plate of the duct to cross, and exposed to the suction passage and the discharge passage, a regenerative heater in the discharge passage of the duct adjacent to air inlet of the dehumidifier for heating the air introduced into the dehumidifier, a regenerative heat exchanger mounted both in the suction passage and the discharge passage on a room side with reference to the dehumidifier for making heat exchange of the air flowing in the suction passage and the air flowing in the discharge passage, and a heat pump having a first heat exchanger in the discharge passage between the dehumidifier and the regenerative heat exchanger, and a second heat exchanger in the suction passage on the air outlet of the regenerative heat exchanger.

The air conditioning system further includes a regenerative heater in the discharge passage of the duct adjacent to an air inlet of the dehumidifier for heating the air introduced into the dehumidifier. The desiccant wheel having desiccant attached to an outside surface for capturing moisture contained in the air drawn through the suction passage, and discharging the captured moisture when positioned in the discharge passage as the desiccant wheel is turned. The desiccant wheel preferably has one half exposed to the suction passage and the other half exposed to the discharge passage. The desiccant is silica gel, or titanium silicate.

In the meantime, the desiccant wheel includes a shaft mounted on the opening, paddles each having a fixed width and extended from the shaft in a radial direction, and a rim surrounding ends of the paddles. The paddle includes a plurality of air pass holes. The duct is circular in conformity with an outside shape of the rim. The paddle has a fixed width in an air flow direction along the discharge passage and the suction passage.

The suction passage and the discharge passage cross in the vicinity of the regenerative heat exchanger, and the regenerative heat exchanger is mounted in a crossed part of the suction passage and the discharge passage.

The regenerative heat exchanger includes a first flow passage in communication with the suction passage for flow of drawing air, and a second flow passage in communication with the discharge passage for flow of discharging air. The regenerative heat exchanger includes a plurality of corrugated plates stacked perpendicular to each other to form layers of the first flow passage and the second flow passage alternately. The regenerative heat exchanger further includes a plurality of flat plates each inserted between adjacent corrugated plates for separating the first and second flow passages.

The heat pump further includes a four way valve for switching a flow direction of refrigerant flowing through the first heat exchanger and the second heat exchanger, and an expansion device for expanding the refrigerant.

The four way valve is switched to a state an outlet of the compressor and the first heat exchanger are connected, and, at the same time, the second heat exchanger and the inlet of the compressor are connected when the room is heated, and switched to a state the outlet of the compressor and the second heat exchanger are connected, and, at the same time, the first heat exchanger and the inlet of the compressor are connected when the room is cooled.

In another aspect of the present invention, there is provided an air conditioning system including a duct having a suction passage for drawing external air and a discharge passage for discharging room air, the suction passage and the discharge passage being split with a split plate, a suction fan and a discharge fan in the suction passage and the discharge passage respectively, a dehumidifier having a desiccant wheel rotatably mounted in an opening in a split plate of the duct to cross, and exposed to the suction passage and the discharge passage, a regenerative heater in the discharge passage of the duct adjacent to air inlet of the dehumidifier for heating the air introduced into the dehumidifier, a regenerative heat exchanger mounted both in the suction passage and the discharge passage on a room side with reference to the dehumidifier for making heat exchange of the air flowing in the suction passage and the air flowing in the discharge passage, and a regenerative heater in the discharge passage of the duct adjacent to air inlet of the dehumidifier for heating the air introduced into the dehumidifier, a parallel passage in, and parallel to the discharge passage between the dehumidifier and the regenerative heat exchanger, and a heat pump having a first heat exchanger in the parallel passage of the discharge passage, and a second heat exchanger in the suction passage on the air outlet of the regenerative heat exchanger.

The parallel passage includes a detachable duct on an outlet side of the first heat exchanger. The air conditioning system further includes a fan adjacent to the first heat exchanger.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. In describing the embodiments, same parts will be given the same names and reference symbols, and repetitive description of which will be omitted.

Figure 1:
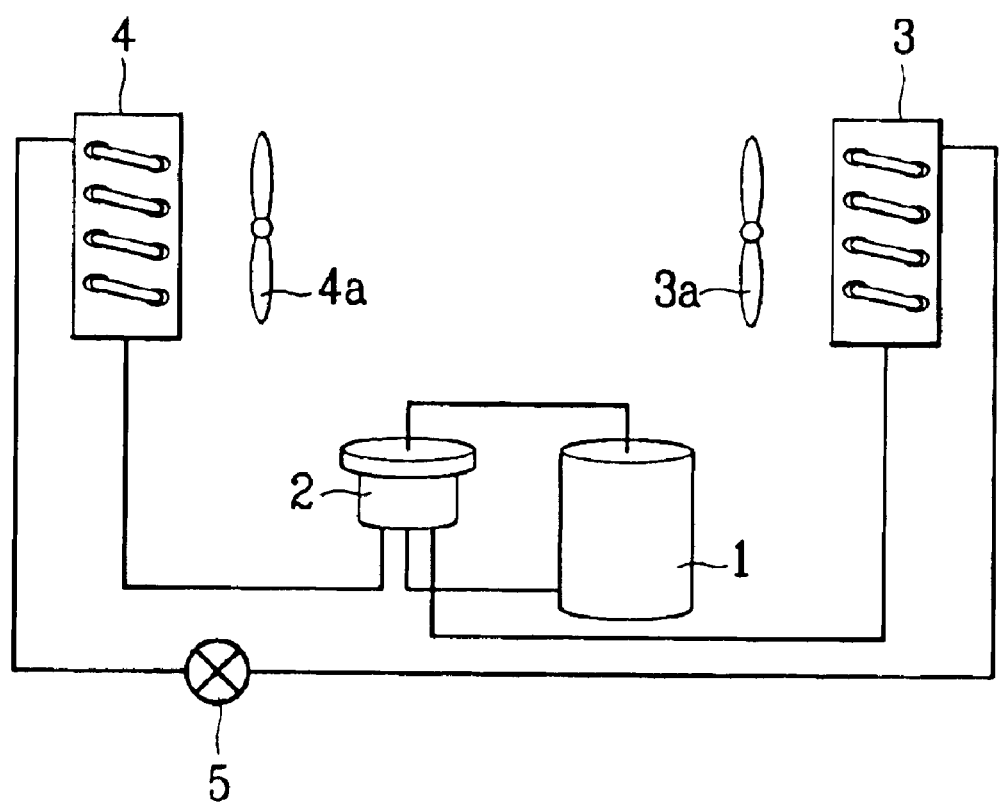
FIG. 1 illustrates a diagram of a related art cooling/heating system.
Figure 2:
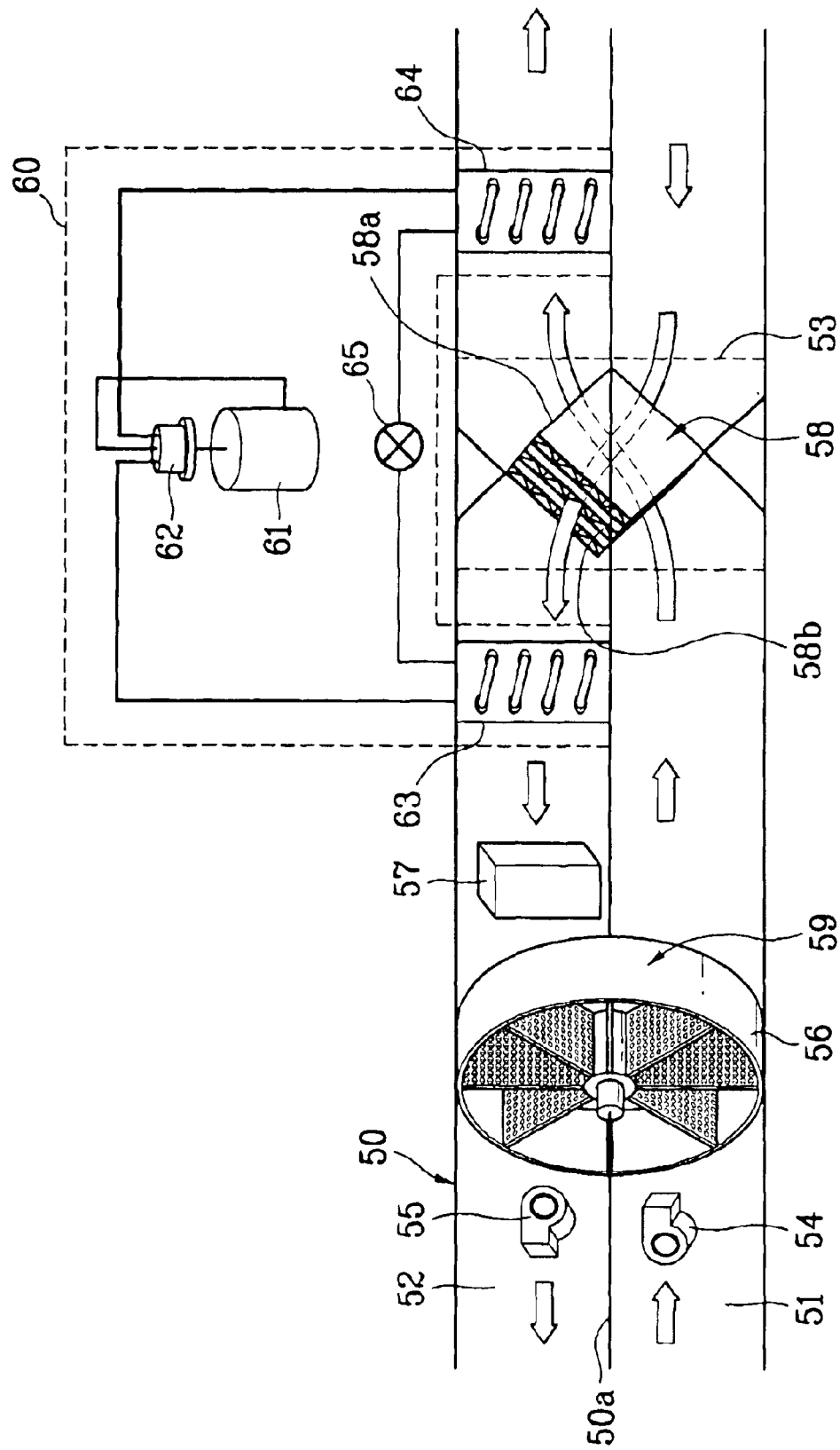
FIG. 2 illustrates a diagram of an air conditioning system in accordance with a first preferred embodiment of the present invention.
Figure 3:
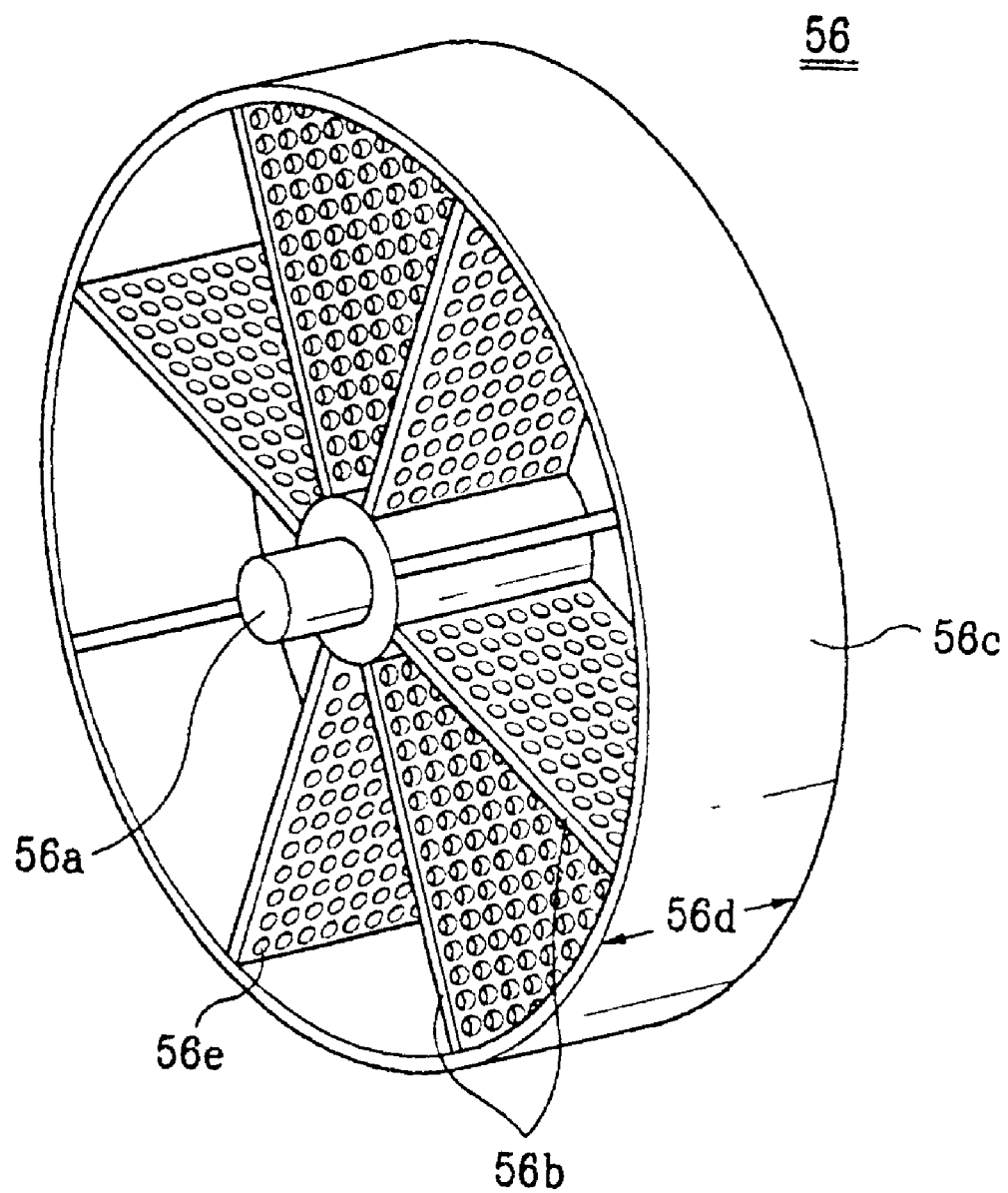
FIG. 3 illustrates a perspective view of the desiccant wheel in the dehumidifier in FIG. 2.

The first embodiment of the present invention will be described, with reference to the attached drawings. FIG. 2 illustrates a diagram of an air conditioning system in accordance with a first preferred embodiment of the present invention, and FIG. 3 illustrates a perspective view of the desiccant wheel in the dehumidifier in FIG. 2.

Referring to FIG. 2, the air conditioner of the present invention includes a duct 50, a suction fan 54, a discharge fan 55, a regenerative heat exchanger 58, and a heat pump 60.

The duct 50 has a suction passage 51 and a discharge passage 52 split with a split plate 50a. The suction fan 54 is mounted in the suction passage 51 for drawing external air, and the discharge fan 55 is mounted in the discharge passage 52 for discharging room air.

In the meantime, there is a dehumidifier 59 in an opening at one side of the split plate 50a. The dehumidifier 59 has desiccant on an outside surface, and a rotatable desiccant wheel 56, so that the dehumidifier 59 absorbs moisture from the air in the suction passage 51, turns to the discharge passage 52, and discharges the moisture into discharging air.

The desiccant is a material which absorbs moisture from gas below a temperature and discharges the moisture above a temperature. Preferably, the desiccant is formed of silica gel, or titanium silicate.

Referring to FIG. 2, around one half H1 of the desiccant wheel 56 is exposed to the suction passage 51, and the other half H2 of the desiccant wheel 56 is exposed to the discharge passage 52. It can be noted that the duct 50 can be changed to adjust a ratio of the exposure to the suction passage 51 and the discharge passage 52.

A preferred embodiment of the dehumidifier 59 with the desiccant wheel 56 will be described in detail.

Referring to FIG. 3, the desiccant wheel 56 includes a shaft part 56a, paddles 56b, and a rim 56c. Both ends of the shaft part 56a are rotatably supported on the split plate 50a. The paddles 56b are extended from the shaft part 56a in a radial direction, to form an air passage between adjacent paddles 56b. The rim 56c surrounds outer ends of the paddles 56b. The desiccant wheel 56 is rotated by a power transmission device such as a motor connected to the shaft part 56a.

For reducing rotation of the desiccant wheel 56 to interference with air flows in the discharge and the suction passages 52 and 51, the paddle 56b has a plurality of air pass holes 56e. A part the air passing through the suction passage 51 and the discharge passage 52 comes into contact the most is the paddles 56b of the desiccant wheel 56. When the desiccant wheel 56 rotates, though the paddles 56b interfere the air flow, if there are the plurality of air pass holes 56b in the paddles 56b, the interference with the air flow is reduced. Moreover, the air pass holes 56e increase a contact area between the paddles 56b and the air effectively, to enable more uniform contact. The rim 56c also has the air pass holes for better contact with the air containing moisture.

In the meantime, it is preferable that a section of the duct 50 is circular in conformity with an outer circumferential form of the rim 56c of the desiccant wheel 56. Therefore, most of the air flows through an inner part of the rim 56c and is brought into contact with the desiccant attached to the paddles 56b.

In the meantime, to secure an appropriate dehumidification, the paddle 56b has a width 56d along a direction of the air flow in the discharge passage 52 and the suction passage 51. The width 56d is fixed taking an outdoor environment and humidity of the place the air conditioning system is installed. For an example, if it is intended to install the air conditioning system at a place with high humidity, it is preferable that the width 56d of the paddle is large to increase the contact area with the air for enhancing a dehumidifying effect.

A dehumidifying process of the dehumidifier 59 with the desiccant wheel 56 will be described in more detail.

The desiccant wheel 56 captures moisture contained in external air at a part H1 exposed to the suction passage 51. The part H1 moves to the discharge passage 52 as the desiccant wheel turns, and discharges the moisture into the room air as the part H1 is heated by the room air passing therethrough which is heated by the regenerative heater 57 or the like. Then, the moisture is discharged to exterior laden on the room air. Thus, a certain portion of the moisture in the air introduced into the room can be removed.

As described, the desiccant captures the moisture in a gas below a certain temperature, and discharges the captured moisture over a certain temperature. Therefore, it is preferable that the regenerative heater 57 is also provided in the discharge passage 52 in the vicinity of the dehumidifier 56 for discharging the moisture captured by the desiccant. The regenerative heater 57 is mounted on an air inlet side of the dehumidifier 59. The regenerative heater 57 heats air introduced into the dehumidifier 59. The heated air passes through the dehumidifier 59, and makes the moisture in the desiccant to be discharged by a partial pressure of water vapor. That is, by heating the air introduced into the dehumidifier 59, and thereby dropping a relative humidity, the moisture is made to be discharged from the desiccant to the introduced air. The regenerative heater 57 may be a solar collector for generating heat from solar energy, or a device for using waste heat from machinery room in a building.

In the meantime, the regenerative heat exchanger 58 is mounted in the suction and discharge passages 51 and 52 adjacent to the room with reference to the dehumidifier 59 for making the air in the suction and discharge passages 51 and 52 heat exchange as the air passes therethrough.

Referring to FIG. 2, the regenerative heat exchanger 58 is mounted at an intersection 53 of the suction passage 51 and the discharge passage 52 of the duct 50. The regenerative heat exchanger 58 has a first flow passage 58a in communication with the suction passage 51, and a second flow passage 58b in communication with the discharge passage 52. The first flow passage 58a and the second flow passage 58b cross each other but independent. The cross flow of the external air in the suction passage 51 and the room air in the discharge passage 52 through the first flow passage and the second flow passage of the regenerative heat exchanger 58 increases a heat exchange area.

Figure 4:
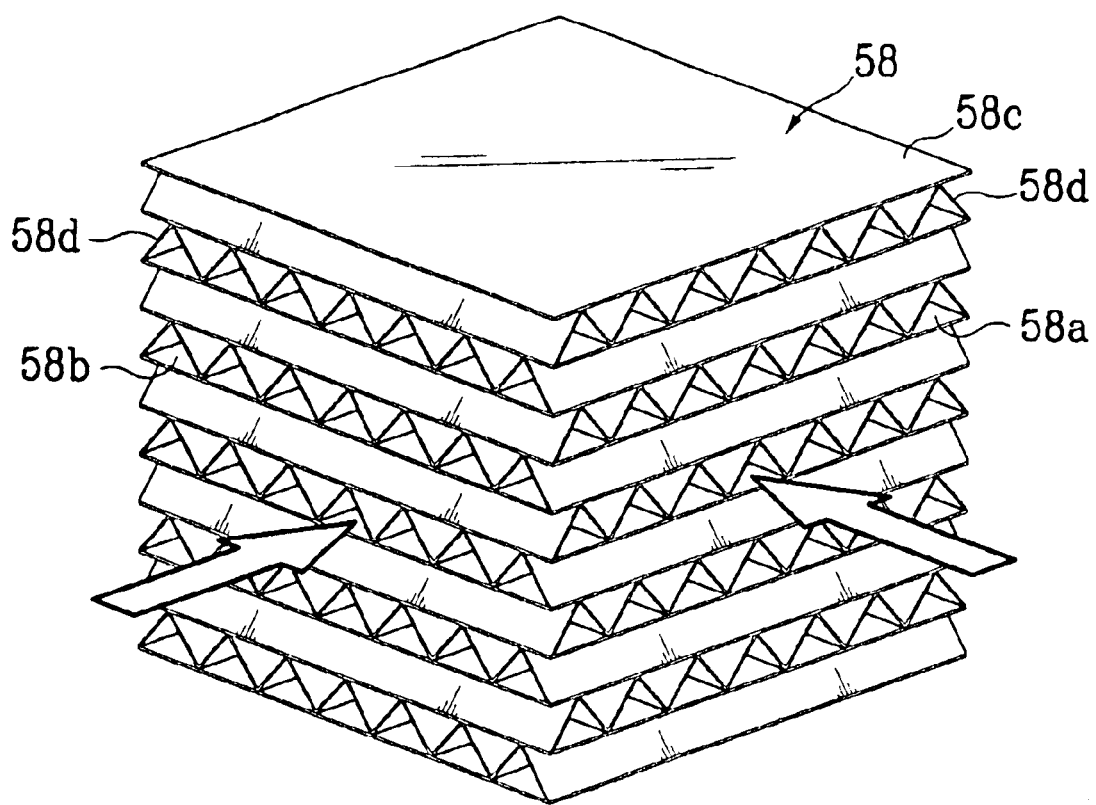
FIG. 4 illustrates a perspective view of the regenerative heat exchanger in FIG. 2.

FIG. 4 illustrates a perspective view of the regenerative heat exchanger in FIG. 2.

Referring to FIG. 4, the regenerative heat exchanger 58 has a plurality of corrugated plates 58d stacked perpendicular to each other, to form the first flow passages 58a and the second flow passages 58b, alternately. The regenerative heat exchanger 58 also has a plurality of flat plates 58c each inserted between adjacent corrugated plates 58d for separating the first flow passage 58a and the second flow passage 58b. It is preferable that the flat plate 58c is attached to the corrugated plate 58d with welding for better heat exchange. The plates 58c and 58d of the regenerative heat exchanger 58 are formed of a material with good heat conductivity, such as aluminum. Of course, a structure of the regenerative heat exchanger 58 is not limited to above, but the regenerative heat exchanger 58 may have a variety of structures.

In the meantime, referring to FIG. 2, the heat pump 60 is mounted in the duct 50 for heat exchange of the air passed through the regenerative heat exchanger 58 and discharging into the room. The heat pump 60 includes a compressor 61, a four way valve 62, first and second heat exchangers 63 and 64, and an expansion device 65. The first heat exchanger 63 is mounted in the discharge passage 52 between the dehumidifier 59 and the regenerative heat exchanger 58. The second heat exchanger 64 is mounted in the suction passage 51 on an air outlet side of the first flow passage 58a of the regenerative heat exchanger 58. The first heat exchanger 63 and the second heat exchanger 64 are connected to the four way valve 62 and the expansion valve 65 to carry out a thermodynamic cycle. In the thermodynamic cycle, the heat exchanger connected to the discharge side of the compressor 61 serves as a condenser to discharge heat to an exterior, and the heat exchanger connected to a suction side of the compressor 61 serves as an evaporator, to absorb heat. Therefore, by proper switching of a refrigerant flow direction by the four way valve 62, a function of the first heat exchanger 63 can be changed, selectively.

The four way valve 62 has two inlets and two outlets. The two inlets are in communication with the two outlets respectively to form two flow passages in total, and connections between the two outlets and the two inlets can be exchanged in response to a switching signal or the like. Therefore, by switching the four way valve 62 under the control of the control part to change the refrigerant flow direction in the first heat exchanger 63 and the second heat exchanger 64, the heat pump 60 can carry out cooling or heating of the room, selectively.

By connecting an outlet of the compressor 61 and the second heat exchanger 64, and the first heat exchanger 63 and an inlet of the compressor 61, the four way valve 62 forms a first state. Also, by connecting the outlet of the compressor 61 and the first heat exchanger 63, and the second heat exchanger 64 and the inlet of the compressor 61, the four way valve forms a second state. In this instance, in the first state, the first heat exchanger 63 serves as an evaporator to cool the room, and the second heat exchanger serves as a condenser to heat the room. In the second stage, the first heat exchanger 63 serves as a condenser to heat the room, and the second heat exchanger serves as an evaporator to cool the room. The room cooling or heating is based on the second heat exchanger 64.

In the meantime, when the room is cooled, since the first heat exchanger 63 serves as a condenser to discharge heat, service of the regenerative heater 57 is supplemented or replaced. That is, the first heat exchanger 63 heats the air discharged to remove moisture from the desiccant. Opposite to this, when the room is heated, since the first heat exchanger 63 serves as an evaporator to absorb heat to cool the discharge air further, it is required that the regenerative heater 57 heats more.

A second preferred embodiment of the present invention that is a modification of the first preferred embodiment will be described with reference to FIG. 5. The second embodiment air conditioning system includes a parallel passage 71 mounted in, and parallel to the discharge passage 52, further.

Figure 5:
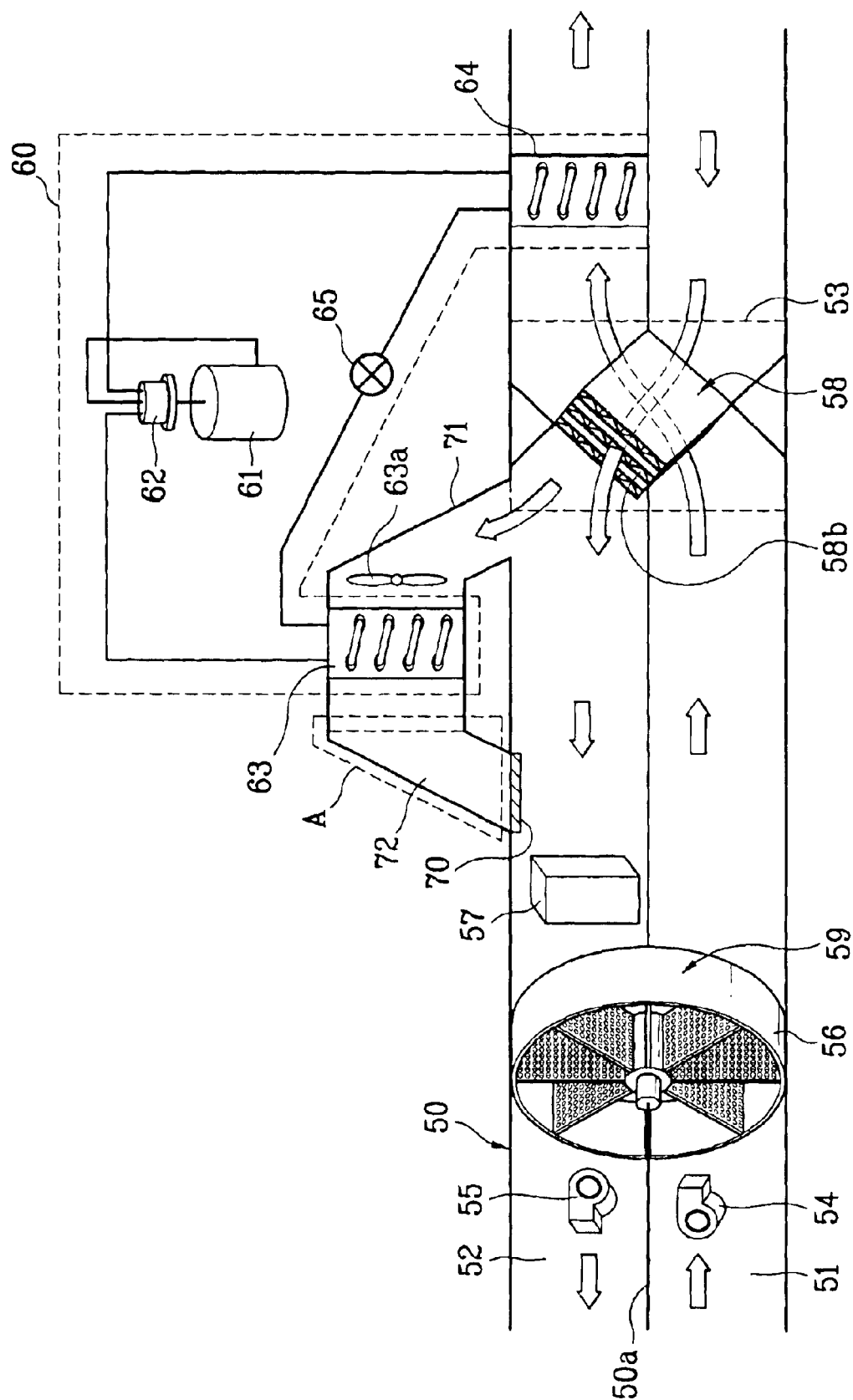
FIG. 5 illustrates a diagram of an air conditioning system having a parallel passage in a discharge passage in accordance with a second preferred embodiment of the present invention.

Referring to FIG. 5, the parallel passage 71 is mounted in, and parallel to the discharge passage 52 between the dehumidifier 59 and the regenerative heat exchanger 58. The first heat exchanger 63 of the heat pump 60 is mounted in the parallel passage 71. There is a fan 63a in the vicinity of the first heat exchanger 63 for blowing air.

The parallel passage 71 changes a flow path of the air flowing through the first heat exchanger 63 when the room is heated. As a system and service of the second embodiment is identical to the first embodiment except the location of the first heat exchanger 63 and the parallel passage 71, description of the second embodiment will be omitted.

Cooling or heating of the room in a case the first heat exchanger 63 is mounted in the parallel passage 71 will be described. When the room is cooled, by switching of the four way valve 62, the first heat exchanger 63 serves as a condenser and the second heat exchanger 64 serves as an evaporator. The air from the room passes through the regenerative heat exchanger 58, and is split into the discharge passage 52 and the parallel passage 71. The air split to the parallel passage 71 is heated at the first heat exchanger 63 and introduced into the regenerative heater. Therefore, as the air is heated at the first heat exchanger 63, an energy required for heating the air at the regenerative heater 57 can be reduced.

On the other hand, when the room is heated, the first heat exchanger 63 serves as an evaporator, and the second heat exchanger 64 serves as a condenser. The air from the room is cooled at the first heat exchanger 63. Since it is required that the air introduced into the dehumidifier 59 is heated to a certain temperature, more energy is required for the regenerative heater 57 to heat the air cooled at the first heat exchanger 63.

The foregoing process is not desirable in view of energy efficiency as energy is wasted for heating the regenerative heater 57. Therefore, when the room is heated, re-introduction of the air passed through the first heat exchanger 63 into the discharge passage is prevented by changing a flow path of the air flowing through the first heat exchanger 63.

Referring to FIG. 5, a connection part 'A' between an air discharge side of the first heat exchanger 63 in the parallel passage 71 and the discharge passage 52 has a detachable duct 72. It is preferable that the detachable duct 72 is formed of a flexible material for easy attachment. When the room is cooled, the detachable duct 72 connects the parallel passage 71 and the discharge passage 52, and, when the room is heated, the detachable duct 72 is detached from the parallel passage 71. After detachable duct 71 is detached, an opening in the discharge passage is covered with a cover 70 for prevention of leakage of air.

When the room is cooled, in which the detachable duct 72 is detached, the air flowing through the parallel passage 71 is cooled at the first heat exchanger 63 and discharged to exterior, directly. The air, passes through the regenerative heat exchanger 58 and keeps flowing through the discharge passage 52, is not cooled as the air does not pass through the first heat exchanger 63, is heated at the regenerative heater 57, and introduced into the dehumidifier.

The functions of the foregoing devices can be summarized as follows. The external air introduced into the dehumidifier 59 is involved in a slight temperature rise as the moisture in the external air is absorbed to the desiccant, passes through, and heat exchanges at the regenerative heat exchanger 58 for the first time. The air then passes through, and heat exchanges at the second heat exchanger 64 for the second time, and introduced into the room. In this instance, a portion of thermal energy is recovered from the air discharged to exterior through the regenerative heat exchanger 58.

The air introduced into the room is discharged to the discharge passage 52 after the air is circulated through the room. The discharge air heat exchanges at the regenerative heat exchanger 58, and flows along the parallel passage 71 or the discharge passage 52. Then, the discharge air, heated either at the regenerative heater 57 or the first heat exchanger 64, is introduced into the dehumidifier 59. The discharge air takes moisture from the desiccant on the dehumidifier 59, and discharges to exterior.

The operation of the air conditioning system will be described for different operation conditions. The air conditioning system can be operated in ventilation, dehumidification, or cooling/heating mode by controlling the suction and discharge fans 51 and 52, the dehumidifier 59, the regenerative heater 57, and the heat pump 60. The ventilation, dehumidification, and cooling mode operation of the air conditioning system will be explained.

The suction fan 54 and the discharge fan 55 are put into operation, and the external air drawn into the suction passage 51 passes through, and is taken of the moisture in the air to the desiccant at the dehumidifier 59. In this instance, the external air is involved in a slight temperature rise as the moisture therein is absorbed to the desiccant.

In this instance, switched by the four way valve 62, the refrigerant circulates the compressor 61, the four way valve 62, the first heat exchanger 63, the expansion device 65, and the second heat exchanger 64 in succession. Therefore, the first heat exchanger 63 serves as a condenser, and the second heat exchanger 64 serves as an evaporator. Then, the external air passes through the first flow passage 58a in the regenerative heat exchanger 58, is cooled at the second heat exchanger 64, and discharged to the room.

After circulating the room, the room air is drawn into the discharge passage 52 by the discharge fan 55. The room air passes through the second flow passage 58b of the regenerative heat exchanger 58, and takes heat from the external air passing through the first flow passage 58a. Thus, the regenerative heat exchanger 58 reduces an energy required for cooling the room. In this instance, the desiccant wheel 56 of the dehumidifier 59 turns and removes moisture from the air drawn into the room.

In the meantime, when the user does not require dried cold air, the dehumidifier 59 is stopped, as no dehumidification is required. When the dehumidifier 59 is stopped, the regenerative heater is also not heated.

Next, ventilation and heating operation of the air conditioning system will be described. In the ventilation, dehumidification, and the cooling operation, the room air is introduced into the dehumidifier without being cooled at the parallel passage 71. As the other air flow is identical to the case of cooling the room, description thereof is omitted. In the meantime, in a case the user does not require dried air, the dehumidifier 59 is stopped, as no dehumidification is required. When the dehumidifier 59 is stopped, the regenerative heater 57 is also not heated.

Next, the ventilation mode of the air conditioning system will be described in detail.

The suction fan 54 is put into operation to circulate the external air through the dehumidifier 59, the regenerative heat exchanger 58, and the second heat exchanger 64 in succession. At the same time with this, the discharge fan 55 is put into operation, to circulate the room air through the regenerative heat exchanger 58, and the dehumidifier 59 in succession. In this instance, the dehumidifier 59, the regenerative heater 57, and the heat pump 60 are not put into operation.

Since the room air is involved in heat exchange while the room air passes through the first, and second flow passages 58a and 58b of the regenerative heat exchanger 58, a portion of heat can be recovered from the room air discharged to exterior. Therefore, in comparison to a ventilation through opened window, the ventilation of the room by the foregoing ventilation operation can reduce temperature variation of the room. The ventilation operation may be carried out in the middle of cooling or heating of the room, or only the ventilation mode can be carried out, independently.

Thus, the air conditioning system of the present invention has the following advantages.

First, the simultaneous ventilation and cooling/heating of the room permits the room air fresh even if the air conditioning system is operated for a long time.

Second, in a case of ventilation and cooling/heating mode operation in a damp day, dried and cooled/heated air can be supplied to the room by removing moisture from the external air by the dehumidifier.

Third, in a case only the ventilation operation is carried out, since the thermal energy is recovered at the regenerative heat exchanger from the room air, a power required for cooling/heating the room again can be reduced.

Fourth, when the room is cooled and dehumidified, since the air heated at the first heat exchanger is introduced into the dehumidifier, a power required for the regenerative heater can be reduce.

Fifth, when the room is heated and dehumidified, the detachable discharge part of the parallel passage, which prevents the air introduced into the dehumidifier from being cooled, a proper operation of the air conditioning system is made possible.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An air conditioning systems, comprising:
    a duct having a suction passage for drawing external air and a discharge passage for discharging room air, the suction passage and the discharge passage being split with a split plate;
    a suction fan and a discharge fan in the suction passage and the discharge passage, respectively;
    a dehumidifier having a desiccant wheel rotatably mounted in an opening in a split plate of the duct to cross, and exposed to the suction passage and the discharge passage;
    a regenerative heater in the discharge passage of the duct adjacent to an air inlet of the dehumidifier for heating the air introduced into the dehumidifier;
    a regenerative heat exchanger mounted both in the suction passage and the discharge passage on a room side with reference to the dehumidifier for making heat exchange of the air flowing in the suction passage and the air flowing in the discharge passage; and
    a heat pump having a first heat exchanger in the discharge passage between the dehumidifier and the regenerative heat exchanger, and a second heat exchanger in the suction passage on the air outlet of the regenerative heat exchanger, wherein the desiccant wheel comprises:
        a shaft mounted on the opening; and
        a plurality of paddles, each paddle having a fixed width and extending from the shaft in a radial direction, the plurality of paddles including a plurality of air pass holes.

2. The air conditioning system of claim 1, further comprising:
    a regenerative heater in the discharge passage of the duct adjacent to an air inlet of the dehumidifier for heating the air introduced into the dehumidifier.

3. The air conditioning system of claim 1, wherein the desiccant wheel having desiccant attached to an outside surface for capturing moisture contained in the air drawn through the suction passage, and discharging the captured moisture when positioned in the discharge passage as the desiccant wheel is turned.

4. The air conditioning system of claim 3, wherein the desiccant wheel has one half exposed to the suction passage and the other half exposed to the discharge passage.

5. The air conditioning system of claim 3, wherein the desiccant is silica gel.

6. The air conditioning system of claim 3, wherein the desiccant is titanium silicate.

7. The air conditioning system of claim 1, wherein the desiccant wheel
    further comprises a rim surrounding ends of the plurality of paddles.

8. The air conditioning system of claim 7, wherein the duct is circular in conformity with an outside shape of the rim.

9. The air conditioning system of claim 7, wherein the paddle has a fixed width in an air flow direction along the discharge passage and the suction passage.

10. The air conditioning system of claim 1, wherein the suction passage and the discharge passage cross in the vicinity of the regenerative heat exchanger, and the regenerative heat exchanger is mounted in a crossed part of the suction passage and the discharge passage.

11. The air conditioning system of claim 10, wherein the regenerative heat exchanger includes;
    a first flow passage in communication with the suction passage for flow of drawing air, and
    a second flow passage in communication with the discharge passage for flow of discharging air.

12. The air conditioning system of claim 11, wherein the regenerative heat exchanger includes a plurality of corrugated plates stacked perpendicular to each other to form layers of the first flow passage and the second flow passage alternately.

13. The air conditioning system of claim 12, wherein the regenerative heat exchanger further includes a plurality of flat plates each inserted between adjacent corrugated plates for separating the first and second flow passages.

14. The air conditioning system of claim 1, wherein the heat pump further includes;

a four way valve for switching a flow direction of refrigerant flowing through the first heat exchanger and the second heat exchanger, and an expansion device for expanding the refrigerant.

15. The air conditioning system of claim 14, wherein the four way valve is switched to a state an outlet of the compressor and the first heat exchanger are connected, and, at the same time, the second heat exchanger and the inlet of the compressor are connected when the room is heated, and switched to a state the outlet of the compressor and the second heat exchanger are connected, and, at the same time, the first heat exchanger and the inlet of the compressor are connected when the room is cooled.

16. An air conditioning system, comprising:

a duct having a suction passage for drawing external air and a discharge passage for discharging room air, the suction passage and the discharge passage being split with a split plate;

a suction fan and a discharge fan in the suction passage and the discharge passage, respectively;

a dehumidifier having a desiccant wheel rotatably mounted in an opening in a split plate of the duct to cross, and exposed to the suction passage and the discharge passage;

a regenerative heat exchanger mounted both in the suction passage and the discharge passage on a room side with reference to the dehumidifier for making heat exchange of the air flowing in the suction passage and the air flowing in the discharge passage; and a regenerative heater in the discharge passage of the duct adjacent to air inlet of the dehumidifier for heating the air introduced into the dehumidifier;

a parallel passage in, and parallel to the discharge passage between the dehumidifier and the regenerative heat exchanger; and a heat pump having a first heat exchanger in the parallel passage of the discharge passage, and a second heat exchanger in the suction passage on the air outlet of the regenerative heat exchanger.

17. The air conditioning system of claim 16, wherein the parallel passage includes a detachable duct on an outlet side of the first heat exchanger.

18. The air conditioning system of claim 16, further comprising a fan adjacent to the first heat exchanger.

19. The air conditioning system of claim 16, wherein the desiccant wheel having desiccant attached to an outside surface for capturing moisture contained in the air drawn through the suction passage, and discharging the captured moisture when positioned in the discharge passage as the desiccant wheel is turned.

20. The air conditioning system of claim 19, wherein the desiccant is silica gel.

21. The air conditioning system of claim 19, wherein the desiccant is titanium silicate.

22. The air conditioning system of claim 16, wherein the desiccant wheel has one half exposed to the suction passage and the other half exposed to the discharge passage.

23. The air conditioning system of claim 16, wherein the desiccant wheel includes;

a shaft mounted on the opening, paddles each having a fixed width and extended from the shaft in a radial direction, and a rim surrounding ends of the paddles.

24. The air conditioning system of claim 23, wherein the paddle includes a plurality of air pass holes.

25. The air conditioning system of claim 23, wherein the duct is circular in conformity with an outside shape of the rim.

26. The air conditioning system of claim 23, wherein the paddle has a fixed width in an air flow direction along the discharge passage and the suction passage.

27. The air conditioning system of claim 16, wherein the suction passage and the discharge passage cross in the vicinity of the regenerative heat exchanger, and the regenerative heat exchanger is mounted in a crossed part of the suction passage and the discharge passage.

28. The air conditioning system of claim 27, wherein the regenerative heat exchanger includes;

a first flow passage in communication with the suction passage for flow of drawing air, and a second flow passage in communication with the discharge passage for flow of discharging air.

29. The air conditioning system of claim 27, wherein the regenerative heat exchanger includes a plurality of corrugated plates stacked perpendicular to each other to form layers of the first flow passage and the second flow passage alternately.

30. The air conditioning system of claim 29, wherein the regenerative heat exchanger further includes a plurality of flat plates each inserted between adjacent corrugated plates for separating the first and second flow passages.

31. The air conditioning system of claim 16, wherein the heat pump further includes;

a four way valve for switching a flow direction of refrigerant flowing through the first heat exchanger and the second heat exchanger, and an expansion device for expanding the refrigerant.

32. The air conditioning system of claim 31, wherein the four way valve is switched to a state an outlet of the compressor and the first heat exchanger are connected, and, at the same time, the second heat exchanger and the inlet of the compressor are connected when the room is heated, and switched to a state the outlet of the compressor and the second heat exchanger are connected, and, at the same time, the first heat exchanger and the inlet of the compressor are connected when the room is cooled.

* * * * *

UNITED STATES PATENT AND TRADEMARK OFFICE
CERTIFICATE OF CORRECTION

PATENT NO. : 6,915,655 B2  
DATED : July 12, 2005  
INVENTOR(S) : W. H. Lee et al.

It is certified that error appears in the above-identified patent and that said Letters Patent is hereby corrected as shown below:

<u>Column 9,</u>
Line 54, "systems" should be -- system --.

Signed and Sealed this

Twenty-eighth Day of March, 2006

JON W. DUDAS  
*Director of the United States Patent and Trademark Office*